United States Patent [19]

Airhart

[11] Patent Number: 4,819,759
[45] Date of Patent: Apr. 11, 1989

[54] TELESCOPING ACTUATOR FOR IMPULSIVE SEISMIC SOURCE

[75] Inventor: Tom P. Airhart, Plano, Tex.

[73] Assignee: Atlantic Richfield Company, Los Angeles, Calif.

[21] Appl. No.: 168,076

[22] Filed: Mar. 14, 1988

[51] Int. Cl.[4] ............................................. G01V 1/147
[52] U.S. Cl. ................................ 181/121; 181/114; 92/52
[58] Field of Search ............... 181/113, 114, 119, 121; 367/143, 189, 190; 92/51, 52, 53

[56] References Cited

U.S. PATENT DOCUMENTS

| | | | |
|---|---|---|---|
| 4,284,164 | 8/1981 | Airhart | 181/117 |
| 4,284,165 | 8/1981 | Airhart et al. | 181/119 |
| 4,402,381 | 9/1983 | Airhart | 181/114 |
| 4,484,657 | 11/1984 | Barta | 181/121 |
| 4,660,674 | 4/1987 | Airhart | 181/113 |
| 4,702,344 | 10/1987 | Airhart | 181/121 |
| 4,735,280 | 4/1988 | Cole | 181/113 |

Primary Examiner—Brian S. Steinberger
Attorney, Agent, or Firm—Robert M. Betz

[57] ABSTRACT

An impact type surface seismic source powered by compressed air includes an elongated piston which moves within the bore of a cylindrical firing tube suitably mounted above an earth contacting target. The firing tube consists of two or more tubular sections slidably joined in telescopic relation. When the piston is allowed to fall from a cocked position, compressed air enters the bore above the piston through side ports and drives the piston downwardly. At the same time, the inner sliding section or sections of the firing tube are exposed to the same air pressure within the bore and are also driven downwardly. In this way, the bore of the firing tube lengthens automatically to provide a longer stroke for the piston and thus a greater attained kinetic energy of impact for a given operating pressure as the piston reaches the target. The apparatus is designed for mounting on a transport vehicle so that the firing tube itself may be raised in operation and lowered for reduced vehicle profile during transport.

10 Claims, 5 Drawing Sheets

TELESCOPING ACTUATOR FOR IMPULSIVE SEISMIC SOURCE

BACKGROUND OF THE INVENTION

1. Field of the Invention

This invention relates generally to the field of geophysical prospecting and more particularly to an apparatus for the generation of seismic waves in the earth by impulsive means.

2. Description of the Prior Art

Injection of seismic signals into the earth by means of apparatus which utilizes compressed gas to propel an impact mass against a rigid earth contacting target is described in U.S. Pat. No. 4,284,164 to Tom P. Airhart and U.S. Pat. No. 4,284,165 to Tom P. Airhart, et al, both entitled "Acoustic Pulse Generator" and issued Aug. 18, 1981, the contents of such patents being hereby incorporated herein by reference. A significant advantage of such devices is their ability to produce rapidly repeated high energy seismic signals of carefully controlled energy content, and they are well suited to the production of either pure compressional waves or combined compressional and shear waves, devices of the latter capability being commonly termed "multi-component" sources.

In accordance with the teachings of such prior art and related patents, compressed gas is admitted on signal within the bore of a hollow cylindrical housing at high pressure, say 300 p.s.i., in a manner to drive a movable elongated piston from a cocked position within such bore so as to strike an earth-contacting target, positioned adjacent one end of the housing, after which the piston is returned to the cocked position for a subsequent shot. If the compressed gas is prevented from escaping from the housing during each shot in accordance with the teachings of allowed U.S. patent application Ser. No. 06/841,637 entitled "Vent Means For Closed Air System" filed in the name of Tom P. Airhart on Mar. 20, 1986, incorporated herein by this reference, the return of such piston means repressurizes the system to substantially the same driving pressure.

To facilitate seismic surveying along a selected line or path, apparatus as described is normally mounted on a transport vehicle. Operation of hydraulic lift cylinders secured between the vehicle chassis and the target transfers the vehicle weight from its tires to such target. Means are provided for adjusting the angle which the housing bore makes with the vertical. In this way the apparatus may be operated either as a P-Wave or multi-component source. In operating such apparatus, the downward acceleration of the piston against the target is necessarily accompanied by a corresponding upward recoil against its housing. This recoil is in turn transmitted to the vehicle itself, which must be sufficiently heavy and stable to absorb this shock without experiencing unacceptable levels of mechanical stress or upsetting movements. This places certain constraints on the design of the overall system.

Typically, a seismic source of the type described is mounted on an off-road, four-wheeled "buggy" which, together with associated air compressors, hydraulic equipment and the like may easily weigh upwards of 50,000 pounds in addition to the very significant weight of the housing, piston and target. It would be advantageous however, to employ a smaller, lighter transport vehicle to carry and operate the seismic source. One reason is to meet the size and weight limitations imposed on "highway legal" vehicles. Another is to enable the source to operate with greater mobility on rugged terrain. By reducing operating pressure and leaving other design parameters unchanged, one can match the source to such smaller scale vehicles without intolerable reaction forces. But this necessarily degrades signal strength, because the amplitude of the seismic signal produced is a function of the attained kinetic energy of the descending piston at the moment of target impact. This energy is in turn directly proportional to the operating pressure for a given piston mass and length of stroke.

Thus, it is one object of this invention to provide a vehicle-transported seismic source of the character described which minimizes vehicle size and weight requirements without sacrificing the strength and quality of the signal produced.

It is a more particular object of the invention to provide a seismic source of the character described wherein operating pressure is reduced without corresponding reduction in signal strength.

Other and further objects and advantages of this invention will become apparent from a consideration of the detailed description set forth below taken in conjunction with the accompanying drawings.

SUMMARY OF THE INVENTION

In accordance with a broad aspect of the invention, an impulsive seismic source for impacting an earth-coupled target is described of the type including a cylindrical firing tube defining a bore closed at one end and open at the other and having a sidewall penetrated by one or more ports; a source of compressed gas in communication with the bore of the firing tube through the ports; means for mounting the firing tube in spaced relation above and aimed at the target such that the closed end of the bore is uppermost; an elongated piston extending movably within the firing tube through the open end of the bore and having a top end facing the closed end of the bore; means for releasably supporting the piston in an upper cocked position in which it sealingly engages the bore above the ports so as to isolate the top end of the piston from the compressed air; means responsive to a firing signal for releasing the supporting means so as to allow the piston to fall until the top end of the piston is exposed to the compressed air, which then drives the piston against the target; and means for returning the piston to such cocked position.

In this invention, the firing tube comprises an outer tubular section fixed to the mounting means and at least one inner tubular section slidably joined therewith in concentric telescopic relation such that the outer and inner sections form respectively the closed and open ends of the bore, the inner section being continuously exposed to the compressed air through the ports so as to experience downward axial force. The piston is provided with a flange adjacent its bottom end which extends radially outward of the bore beneath its open end and which supportively engages the inner section from beneath when the piston is in the cocked position so as to resist such downward axial force. When the piston is driven downwardly responsive to the firing signal, it separates from the inner section which thereupon follows the piston in the same direction under the same driving pressure so as to extend the length of the bore. This provides a stroke for the piston which lengthens in proportion to such extension and in sufficient amount to enable the piston to reach the target without disengagement from the firing tube.

In a more limited aspect, the mounting means comprise adjustable means for raising the outer section of the firing tube relative to the target preparatory to firing and lowering it for transport.

In a still more limited aspect, means are provided intermediate the outer and inner tube sections which cushion and limit the telescopic extension of the inner section.

In a yet further aspect of the invention, the mounting means comprise means for adjustably tilting the axis of the firing tube so that it is directed along a preselected slant path, either during transport or preparatory to a firing operation.

DETAILED DESCRIPTION OF THE PREFERRED EMBODIMENT

Figure 1:
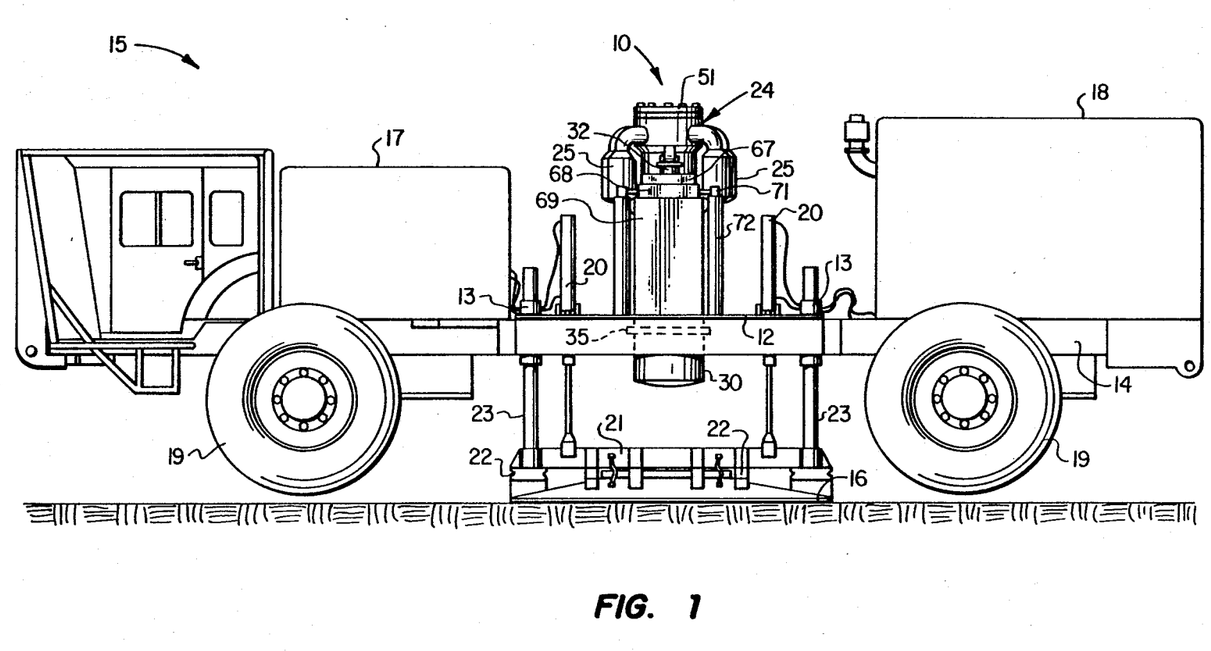
FIG. 1 is a simplified vertical elevational view of a vehicle-transported seismic source apparatus in accordance with a preferred embodiment of this invention showing the actuator assembly with its firing tube.
Figure 2:
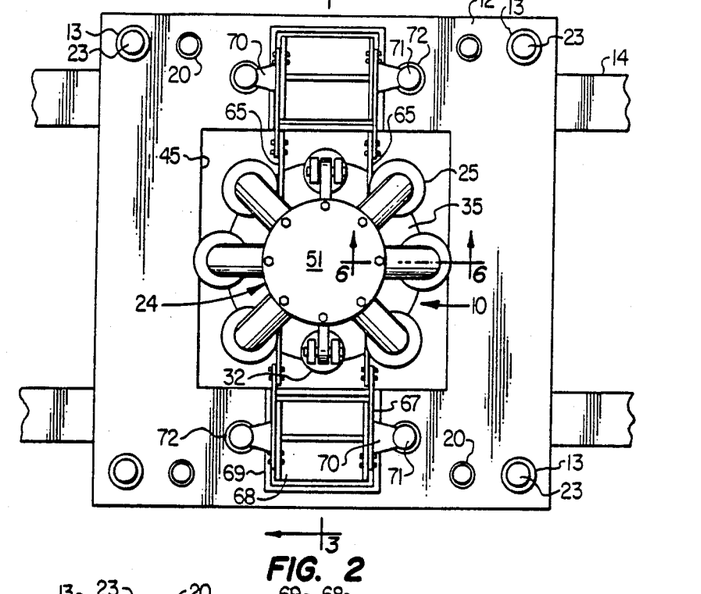
FIG. 2 is a simplified plan view of the apparatus of this invention showing the general relationship between the actuator assembly and its associated mounting hardware.

Referring now to FIGS. 1 and 2 a seismic source in accordance with this invention comprises an actuator assembly 10 mounted on a platform 12 supported across a pair of longitudinal chassis rails 14 of a motorized transport vehicle 15. A target 16 for receiving an impact and coupling the transferred energy into the earth is positioned beneath vehicle 15, which includes a forward control section for actuator assembly 10 and a rear-mounted engine section represented respectively by reference numerals 17 and 18. As shown, the weight of vehicle 15 has been transferred from tires 19 so as to bear upon target 16. This is accomplished by extention of a plurality of hydraulic lift cylinders 20 secured adjustably between platform 12 and a horizontal lift frame 21. With such extention a plurality of elastomeric supports 22 dependently attached to frame 21 bear downwardly against the upper surface of target 16. As lift frame 21 is raised or lowered four upstanding guide rods 23 mounted at the corners of lift frame 21 extend slidably through sleeves 13 fixed to platform 12 to help stabilize the apparatus. The manner in which the weight of vehicle 15 is transferred preparatory to a firing operation employing components such as detailed above is more particularly described in U.S. Pat. No. 4,660,674 entitled "Mounting and Control Means For Full Wave Form Seismic Source" issued to Tom P. Airhart on Apr. 28, 1987, the contents of which are incorporated herein by reference. This ensures that target 16 will not experience lateral shifting during operation and lessens the likelihood that upward reaction forces will cause misalignment between vehicle 15 and target 16.

Figure 3:
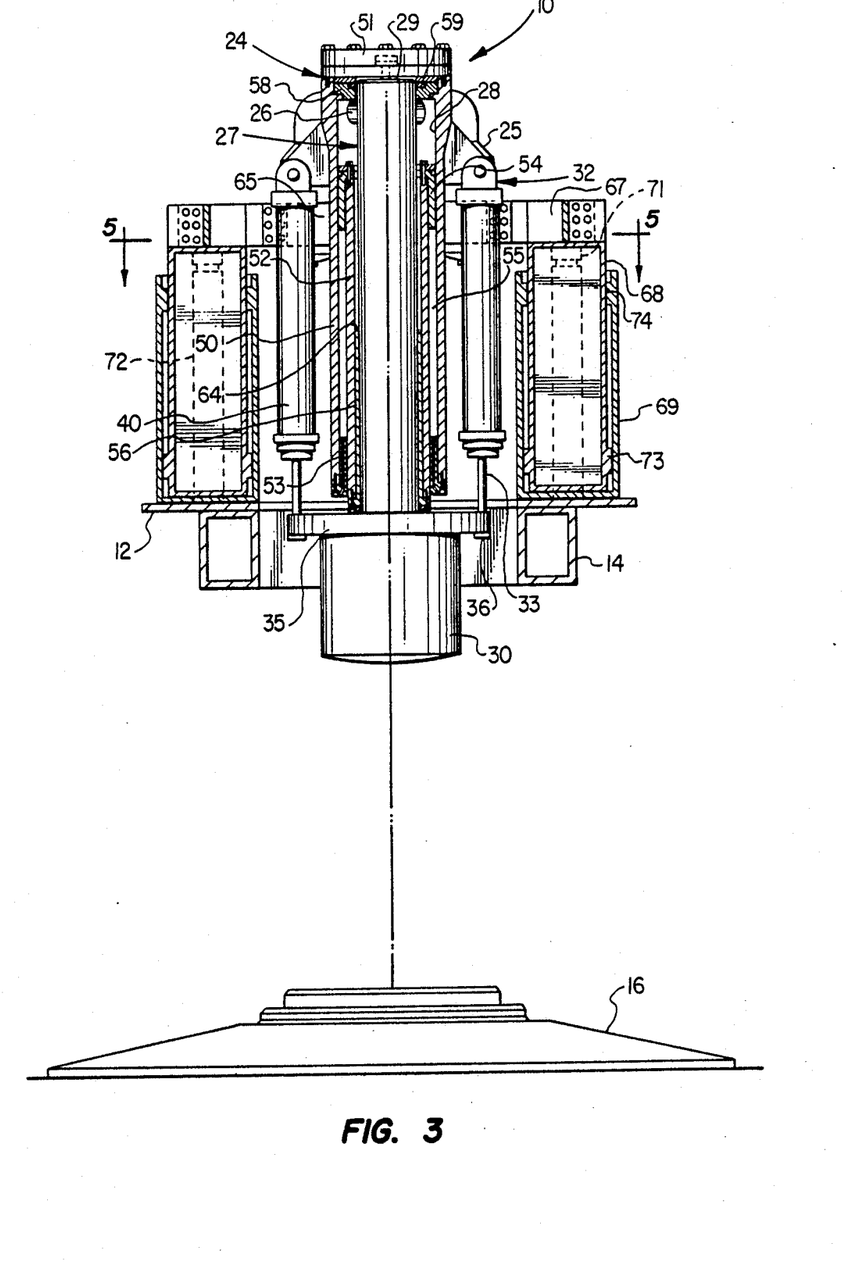
FIG. 3 is a vertical sectional view taken along the line 3—3 in FIG. 2, with certain components shown in elevation illustrating the actuator assembly in a lowered position for transport with the piston upwardly retracted.
Figure 4:
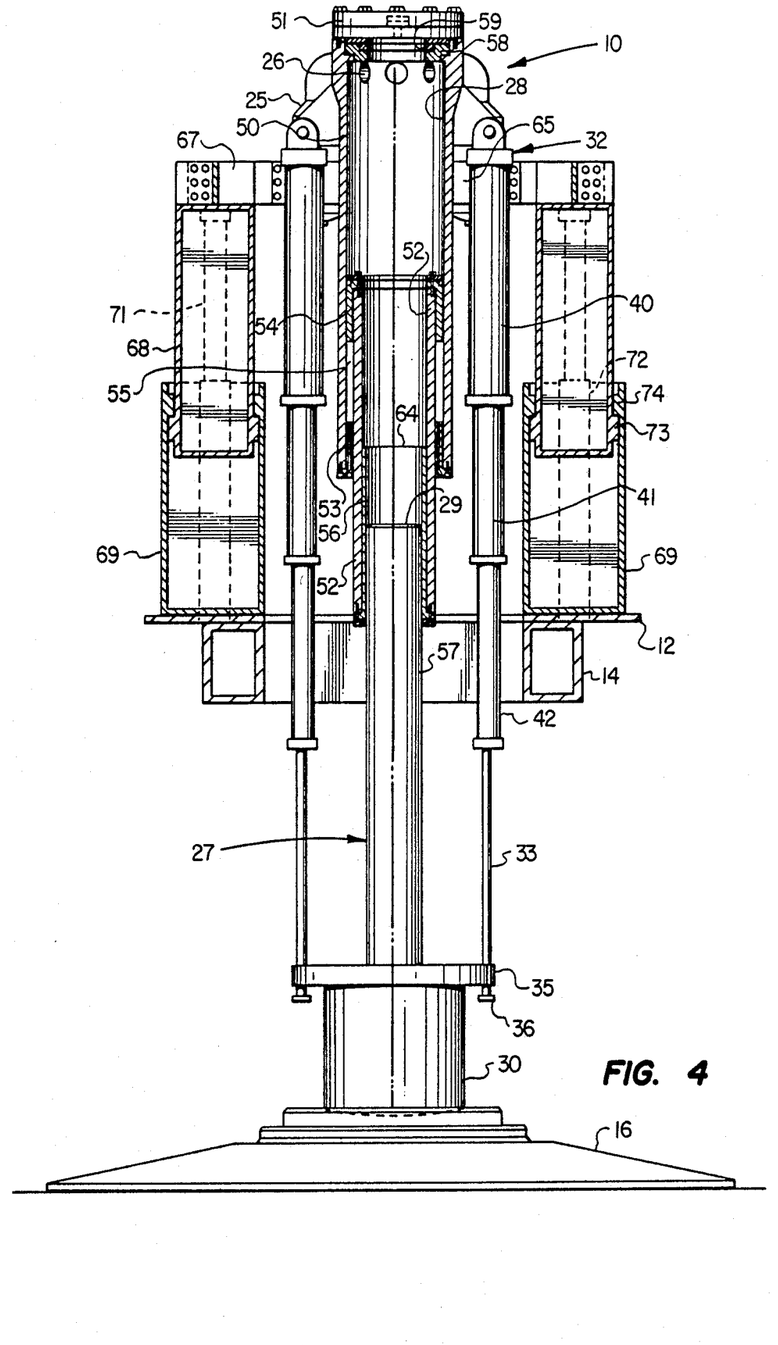
FIG. 4 is a further vertical sectional view similar to FIG. 3, but showing the actuator assembly in a raised position during the stage of a firing operation wherein the piston has been driven downwardly into contact with the earth-coupled target.

With additional reference to FIGS. 3 AND 4 actuator assembly 10 comprises generally a hollow, upstanding, cylindrical firing tube 24, a plurality of external compressed air vessels 25 continuously communicating within the bore 28 of tube 24 through circumferential ports 26 adjacent its closed upper end, and an enlongated piston 27 for delivering a blow to target 16. Piston 27 which projects upwardly within bore 28 through its lower open end has a top face 29 and at its bottom end terminates in an enlarged diameter, impact mass 30 which in operation remains external to tube 24. Piston 27 may be lifted upwardly within tube 24 to a cocked firing position (which is also its transport position) by means of a pair of telescoping hydraulic mass retrieval cylinders 32 secured to and axially aligned with firing tube 24. A pair of piston rods 33 project downwardly from their respective cylinders 32 and extend slidably through peripheral holes in a circular flange 35 forming the top of mass 30. A pair of retainer caps 36 formed at the lower ends of rods 33 contact and apply lift force to the underside of flange 35 as rods 33 are withdrawn upwardly or maintained in a retracted position. As best seen in FIG. 4, telescoping cylinders 32 are each seen to consist of multiple slidably interconnected stages such as barrels 40, 41, and 42 and are of a type well known to those skilled in this art. Thus, their operation requires no detailed explanation. In this invention, however, they are useful because of their cooperation with other telescoping components to be described.

With further reference to FIG. 2, actuator assembly 10 is disposed so that it extends through a central aperture 45 in platform 12 and is mounted adjustably thereon so that it may be raised for a firing operation or lowered for transport as discussed in greater detail below. Raising actuator assembly 10 increases the distance piston 27 must travel from its cocked position before striking target 16. To satisfy this requirement, firing tube 24, is designed, as will be explained, so that it automatically extends with movement of piston 27, thereby providing an available length of stroke within tube 24 which equals or exceeds the necessary travel distance to target 16.

Again referring to FIGS. 3 and 4, firing tube 24 is formed of two major parts, namely, an outer tubular section 50 having a closed top cover 51 and an inner open ended tubular section 52 which works slidably within section 50 in telescopic relation and which receives and guides the piston 27. When piston 27 is lifted by means of cylinders 32 and has traveled some distance from the bottom of its stroke, flange 35 engages inner section 52 from beneath and carries it upward until piston 27 reaches its cocked position. In such fully cocked position of piston 27, flange 35 continues to bear against and support the lower end of section 52 and therefore also determines its upper most position. Section 50 and section 52 are spaced radially apart by means of lower and upper annular bearings 53 and 54 secured respectively thereto and longitudinally separated by means of an annular air filled space 55. This separation defines the maximum allowable extension for section 52. An additional annular bearing 56 is secured to the inner surface of section 52 and contacts the wall 57 of piston 27. The length of bearing 56 is sufficient to ensure that piston 27 does not become misaligned in operation so as to produce interference or binding between moving parts of the system.

Figure 6:
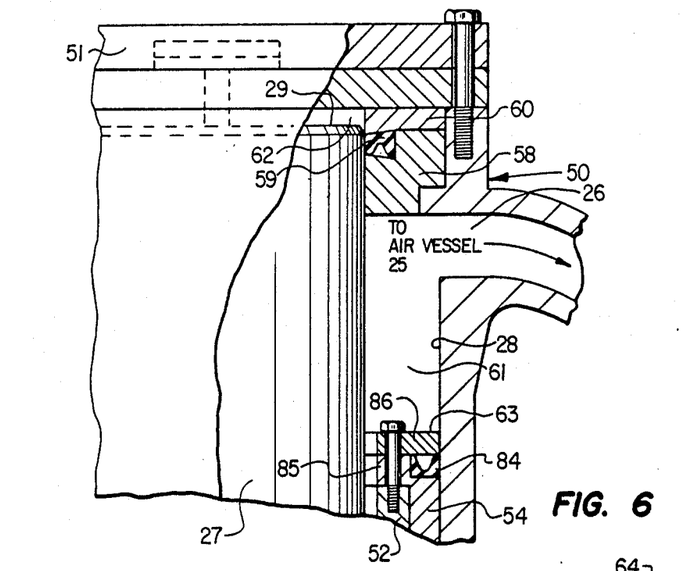
FIG. 6 is an enlarged detailed sectional view of the upper portion of the firing tube with the piston cocked and ready to fire, illustrating two of the pressure seals employed, one fixed and one movable, and the annular air space, in the bore of the firing tube above the telescoping inner firing tube section, exaggerated in thickness for clarity.
Figure 7:
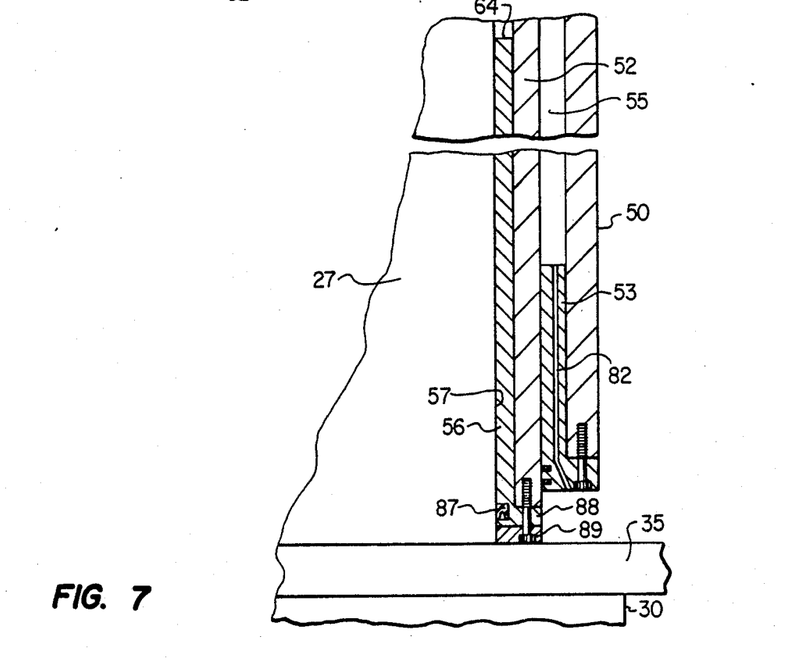
FIG. 7 is a further enlarged detailed sectional view of the lower end of the firing tube in the upwardly retracted position of the inner tube section as supported by the enlarged diameter flange adjacent the bottom end of the piston showing the movable bottom pressure seal in contact with the piston.

As best seen in FIG. 6, the upper end of section 50 within bore 28 is provided with a fixed annular bearing 58 situated beneath top cover 51 and having a thickness which reduces the effective diameter of bore 28 to that of piston 27. A hermetic annular top seal 59 recessed within bearing 58 and secured in position by retainer ring 60 engages piston 27 in its cocked position. This creates an annular space 61 within bore 28 between section 52 and the bearing 58 which is in constant communication with vessels 25 through ports 26. Space 61 in such cocked position is isolated from a clearance 62 within bore 28 established between top face 29 of piston 27 and top cover 51. However, the compressed air in space 61 exerts continuous axial force downwardly against a flat upper surface 63 of a retainer ring 86 on the top of section 52 and also against a flat upper surface 64 of bearing 56 (see FIG. 7) and constitutes the driving air pressure of the actuator 10 at any stage of operation. It should be noted that vent means (not shown) are provided for preventing over-pressure from occurring within clearance 62 in the cocked position of piston 27. Such vent means are thoroughly described in allowed U.S. patent application Ser. No. 06/841,637 referenced above although unnecessary to an understanding of this invention.

Figure 5:
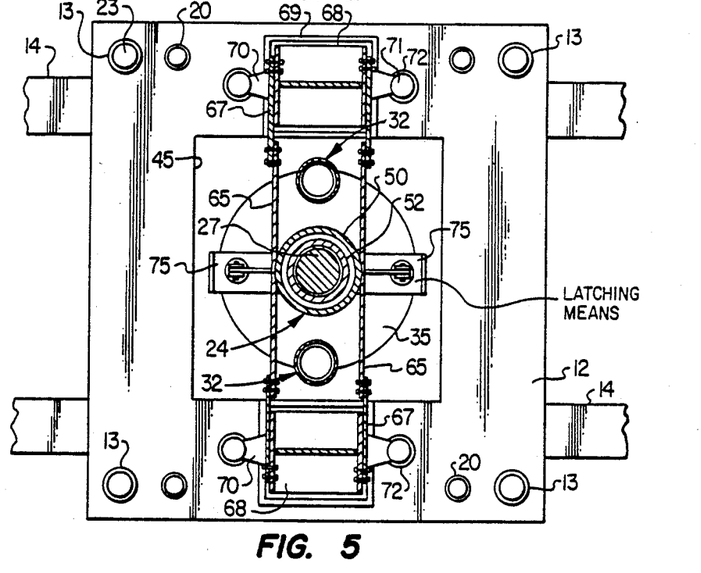
FIG. 5 is a sectional view taken along the line 5—5 in FIG. 3 illustrating the manner of attachment of the actuator assembly to its mounting plates.

When a desired location for field operation to be conducted by means of the seismic source described herein is reached by vehicle 15, target 16 is first lowered into position by extension of lift cylinders 20 and the weight of vehicle 15 is transferred to target 16 as previously described. Thereafter, actuator assembly 10 is deployed from a "low profile" transport position to its raised firing position. With reference to FIG. 5, a pair of upstanding parallel mounting plates 65 are secured in any suitable manner, as by welding, to opposite sides of section 50 above platform 12, fore and aft with respect to vehicle 15, so that they extend transversely to rails 14. With reference again to FIG. 3 and 4, the two adjacent ends of mounting plates 65 on either side of section 50 are in turn connected to a pair of like brackets 67, each secured to the top of one of a pair of rectangular upstanding driver members 68 which are slidably encased respectively within a matching pair of outer housings 69 fixed to platform 12. As best seen in FIG. 2, opposite sides of each driver member 68 are attached by means of fore and aft bridging, force transmitting arms 70 to a pair of pistons 71 operable within and extendable upwardly from a pair of like upright hydraulic cylinders 72 of conventional design, also mounted on platform 12. By operation of hydraulic cylinders 72 and their pistons 71, actuator assembly 10, through the linking elements described above, may be raised as in FIG. 4 and lowered as in FIG. 3. Each driver member 68 includes an outer transverse circumferential flange 73 adjacent its lower end and each housing 69 is provided with a like inner circumferential flange 74 adjacent its upper end. Upon engagement with each other flanges 73 and 74 define the upper level of travel of actuator assembly 10 and ensure that in a firing operation the upper reaction force does not cause complete disengagement of actuator assembly 10 from its mount. It can now be seen that in its lowered position, actuator assembly 10 contributes to a low vehicle profile better adapted to a variety of highway overpass restrictions while the raised position of actuator assembly 10 accommodates greater stroke length for piston 27.

After actuator assembly 10 is raised as described above and in further preparation for a firing operation, rods 33 are lowered to their full extent as shown in FIG. 4 so that piston 27 can be propelled to target 16 without interference with retainer caps 36. A pair of electrically controlled latching means, generally indicated by reference numerals 75 in FIG. 5 and described in U.S. Pat. No. 4,284,165, continue to releasably support opposite sides of flange 35 until disengaged by a suitable firing signal. Upon said signal, piston 27 falls away from top seal 59 (FIG. 6) thereby exposing top surface 29 to compressed air from within the space 61. The in-rushing air forces piston 27 downwardly toward target 16. As piston 27 drops it separates from section 52, which now follows in the same direction, to the limit of its allowable extention under the influence of the same air pressure, thus increasing the available stroke for piston 27. In this way, piston 27 experiences the supplied air pressure over a greater distance and thus attains higher velocity. Hence, a greater kinetic energy is available upon impact with target 16 for a given driving pressure. Viewed another way, by lengthening the effective stroke of piston 27, the operating pressure may be decreased without sacrificing signal strength. The system of this invention is designed so that upon impact of mass 30 against target 16 at least several inches of the upper end of piston 27 remains within the lower end of section 52 to avoid any possibility of complete disengagement.

Referring again to FIG. 4, as section 52 is extended, the compression of the air within space 55 slows the longitudinal approach of bearings 53 and 54 and provides a cushion to prevent impact between these elements. To lessen the reaction forces which may result from such compression, the air in space 55 is vented to atmosphere through a plurality of air bleed passages 82 extending longitudinally through bearing section 53 in the manner of a dash-pot. When piston 27 is retracted so as to engage and lift section 52 to its original position after each shot, air re-enters space 55 for equalization.

The apparatus described above comprises a so called "closed" air system, which is repressurized by cocking piston 27, so that it is essential to prevent air from escaping to atmosphere through the lower end of section 52. Best seen in FIG. 6, a hermetic annular seal 84 is recessed within an inwardly turned upper end 85 of bearing 54 so as to make sliding contact with the inner surface of section 50 and is secured in position by top retainer ring 86 bolted through such upper end 85 into section 52. In similar fashion, as viewed in FIG. 7, a like annular hermetic seal 85 is recessed within the outwardly turned lower end 88 of bearing 56 so as to make sliding contact with piston 27 and is secured in position by bottom retainer ring 89 also bolted through in to section 52. The detail of FIG. 7 further illustrates that in the uppermost position of section 52, clearance is provided between flange 35 of the mass 30 and the lower end of bearing 53. This avoids the possibility that any such contact may prevent accurate seating of piston of piston 27 against top seal 59.

While for illustrative purposes, tube 24 has been described as including two telescoping sections 50 and 52, it should be apparent that as many sliding telescoping sections similar to section 52 may be designed into the apparatus of this invention as necessary to achieve the desired stroke length for piston assembly 27. As more such sections are added, further hermetic seals must be inserted at appropriate interfaces and top seal 59 must in each case be radially set over and recessed in a suitably dimensioned annular top bearing corresponding to bearing 58 so as to make necessary contact with piston 27 when cocked. It is calculated that the addition of only one such telescoping section 52 may effectively increase the available stroke for piston 27 by a factor of two. If, for example, without such stroke extension, an operating pressure of 300 p.s.i. is required in order to develop a selected impact energy for piston 27, with the aid of this invention the operating pressure can be reduced to 150 p.s.i. without loss of signal strength. In addition, the height adjustability of actuator assembly 10 accommodates the greater stroke length of tube 24 without having to raise platform 12 above a practical height for a "highway legal" vehicle. Thus, economy is achieved in operating pressure without adversely affecting vehicle profile. An additional advantage inherent in the longer stroke provided with telescoping tube 24 is that it creates a longer return path for piston 27. This, in turn, permits the use of less powerful lift hydraulics in operation of lift cylinders 32 to recompress the system to a given pressure level. This further contributes to reduction in overall system weight. While recycle time for piston 27 may in this way be increased, to the explorationist this is usually preferable to the alternative of reduced signal strength.

Within the scope of this invention, one may choose to provide alternative mounting arrangements for actuator assembly 10, for example, such as to permit an adjustable tilt of the path of firing tube 24 either in combination with or in substitution for the raising and lowering capabilities described above. Such a tilt arrangement is adequately described in the U.S. Pat. No. 4,660,674, referenced above. Those skilled in the art will have no difficulty combining the mounting structures described in such patent with the telescoping firing tube features described in the present invention. Such an alternative mounting arrangement will enable the operator to maintain a low vehicle profile in transport and to operate the apparatus of this invention either as a pure compressional wave source or as a multi-component or combined compressional and shear wave source.

Considered most broadly the apparatus of this invention provides a system which offers several alternatives in the design of a seismic source to meet given needs. For example, one may choose to reduce the mass of piston 27 to reduce overall weight and yet maintain signal output strength, again by increasing stroke length in the manner described. Those skilled in this art will have no difficulty in devising modifications of the components described and shown in the foregoing specification for illustrative purposes, without departing from the scope and spirit of this invention as set forth in the appended claims.

What is claimed is:

1. Apparatus for impacting an earth coupled target to generate a seismic signal comprising:
    (a) a hollow cylindrical firing tube having a closed and an open end and including an outer tubular section and an inner tubular section joined therewith in slidable telescopic relation for limited relative movement so as to provide a continuous cylindrical bore of variable length wherein the outer and inner sections respectively include such closed and open ends, the outer section further having a side wall penetrated by at least one port opening into the bore;
    (b) means for suspending the outer section in spaced relation above and directed toward the target so that the closed end is uppermost;
    (c) piston means projecting partially within the firing tube through the open end, such piston means terminating beneath such open end in an enlarged diameter portion;
    (d) a source of compressed air in communication with the bore through the port so as to expose the inner section to a continuous downward axial force;
    (e) first annular seal means mounted in the side wall of the outer section between the port and the closed end;
    (f) means for releasably supporting the piston means in a cocked position such as to engage the first seal means and to thereby form a clearance within the bore between the closed end and the piston means which is isolated from the compressed air and so that the enlarged diameter portion of the piston means is spaced from the target, and disposed in dependent supportive engagement with the inner section so as to resist the axial force thereon;
    (g) means for removing such supporting means so as to allow the piston means and the inner section to fall, thereby means and thus enabling the compressed air to enter the clearance and in combination with the continuous axial force simultaneously to drive the piston means and the inner section downwardly, firing the bore being lengthened thereby in proportion to the downward movement of the inner section to enable the enlarged portion of the piston means to strike the target without disengagement of the piston means from the firing tube through the open end; and
    (h) lift means adjustably secured between the outer section and the enlarged portion of the piston means for returning the piston means to the cocked position.

2. Apparatus as claimed in claim 1 further including a transport vehicle upon which the means for suspending the outer section is carried.

3. Apparatus as claimed in claim 2 wherein the means for suspending the outer section includes means for adjustably mounting such, outer section on the vehicle so that the outer section may be raised or lowered relative to the target.

4. Apparatus as claimed in claim 2 wherein the means for suspending the outer section comprises means for adjustably mounting such outer section on the vehicle so as to enable variation of the angular position of the hollow cylindrical firing tube in relation to a vertical direction.

5. Apparatus as claimed in claim 1 further including means for isolating an annular air space of variable longitudinal extent between the outer and inner sections such that the air therein is compressed in proportion to the downward movement of the inner section.

6. Apparatus as in claim 5 further including air bleed means communicating between the annular space and the external environment for gradually equalizing the pressure there between.

7. Apparatus for impacting an earth coupled target to generate a seismic signal comprising:
    (a) a stable platform having a central aperture therein;
    (b) means for supporting the platform above the target;
    (c) a hollow cylindrical firing tube having a closed and an open end and including an outer tubular section and an inner tubular section joined therewith in slidable telescopic relation for limited relative movement such as to form a continuous cylindrical bore of variable length wherein the outer and inner sections respectively include such closed and open ends, the outer section further having a side wall penetrated by at least one port opening into the bore;
    (d) means for mounting the outer section on the platform so that the outer section is disposed within the aperture and directed at the target with its closed end uppermost;
    (e) piston means projecting partially within the firing tube through the open end, such piston means terminating beneath the hollow cylindrical firing tube in an enlarged diameter portion;
    (f) a source of compressed air in communication with the bore through the port so as to expose the inner section to a continuous downward axial force;
    (g) annular seal means mounted in the side wall of the outer section between the port and the closed end;
    (h) means for releasably supporting the piston means in a cocked position such as to engage the seal means and to thereby form a clearance between the closed end and the piston means which is isolated from the compressed air and so that the enlarged diameter portion of the piston means is spaced from the target, and disposed in dependent supportive engagement with the inner section so as to resist the axial force thereon;
    (i) means for removing such supporting means so as to allow the piston means and the inner section to fall, thereby effecting disengagement of the piston means from the seal means thus enabling the compressed air to enter the clearance and, in combination with the continuous axial force, simultaneously to drive the piston means and the inner section downwardly, the bore being lengthened thereby in proportion to the downward movement of the inner section to enable the enlarged portion of the piston means to strike the target without disengagement of the piston means from the firing tube through the open end.

8. Apparatus as claimed in claim 7 wherein the means for mounting the outer section on the platform comprises means for adjusting the height of such outer section relative to the platform.

9. Apparatus as claimed in claim 8 wherein the means for adjusting the height of the outer section comprises a plurality of hydraulic lift cylinders operably interconnected between the platform and the outer section.

10. Apparatus as claimed in claim 1 further including a second and a third annular seal means positioned respectively intermediate the outer and the inner section and intermediate the inner section and the piston means such as to define a space of variable volume within the bore within which the compressed air is confined.

* * * * *

UNITED STATES PATENT AND TRADEMARK OFFICE
CERTIFICATE OF CORRECTION

PATENT NO. : 4,819,759

DATED : April 11, 1989

INVENTOR(S) : Tom P. Airhart

It is certified that error appears in the above-identified patent and that said Letters Patent is hereby corrected as shown below:

Column 8, line 37, after "thereby" insert --- effecting disengagement of the piston means from the first seal ---.

Column 8, line 41, delete "firing".

Column 8, line 57, delete the comma after "such".

Signed and Sealed this

Twelfth Day of December, 1989

Attest:

JEFFREY M. SAMUELS

*Attesting Officer*      *Acting Commissioner of Patents and Trademarks*